Patented Feb. 14, 1950

2,497,259

UNITED STATES PATENT OFFICE 2,497,259

MANUFACTURE OF SOLUTIONS OF POLYMERIZED STYRENE COMPOUNDS

Jacques Paul Camille Elie Corbiere, Lyon, France, assignor to Societe "Rhodiaceta," Paris, France, a company of France No Drawing. Application March 7, 1946, Serial No. 652,820. In France April 29, 1942

Section 1, Public Law 690, August 8, 1946
Patent expires April 29, 1962

2 Claims. (Cl. 260—30.8)

In the specification of my application Serial No. 623,889, filed October 22, 1945, now abandoned, there is described a process for the preparation of solutions of polyvinyl derivatives of high molecular weight which are entirely or partially formed of polyvinyl chloride, this process consisting in dissolving such polymers, if desired with the application of heat and of pressure, in a mixture of at least two liquids, of which one is carbon disulphide.

According to the present invention, it has been discovered that the mixtures used for the solution according to the application above referred to also form excellent solvents, not only for the polymers previously considered in said prior application but also for the synthetic resins resulting from the polymerisation or copolymerisation of styrene.

These polymers which are known to be soluble in carbon disulphide alone have an extraordinarily better solubility in the solvent mixtures forming the object of said prior application, even when these mixtures contain as other constituents one or more liquids which are not solvents or are scarcely solvents for these resins.

The following example shows one case of the application of the process according to this invention, but without limiting it in any manner:

Example

A polystyrene insoluble in acetone and of which a 20% solution in carbon disulphide has a viscosity of 133 poises at 15° C. is used.

By kneading at ordinary temperature a solution is obtained of the same concentration of polystyrene in a mixture of equal volumes of carbon disulphide and of acetone. A solution is obtained of which the viscosity has the remarkably low figure of only 38 poises.

The solutions obtained according to the invention can, like those of the prior application, be treated also with any secondary product or material, particularly they can contain more or less large quantities of polymers soluble in the solvent mixtures described in said prior application; for example, polyvinyl chloride, polyvinyl acetate, polychlorobutadiene, acrylic resins or methacrylic resins, etc. If desired likewise one can add pigments, plasticisers, anti-electrifying agents, colouring materials or substances adapted to give rise to or to regenerate colouring materials, etc. The solutions obtained can be used for any purpose such as varnishes, glues, coating materials for electrical insulation or also for casting films, foils, threads, or for the wet or dry spinning of threads, fibres, bristles, sheets, etc.

What I claim and desire to secure by Letters Patent is:

1. Process for the preparation of solutions of acetone-insoluble polymers prepared from styrene which consists in kneading 10 to about 60 parts of said polymers with 90 to about 40 parts of a mixture of carbon disulphide and acetone said mixture containing at least 30% and not more than 70% of carbon disulphide.

2. Solutions of acetone insoluble polymers prepared from styrene in a mixture of at least 30% and not more than 70% of carbon disulphide with acetone and containing 10 to 60 parts of said polymers per 100 parts of solution.

JACQUES PAUL CAMILLE ELIE CORBIERE.

REFERENCES CITED

The following references are of record in the file of this patent:

UNITED STATES PATENTS

| Number | Name | Date |
|---|---|---|
| 1,683,402 | Ostomislensky | Sept. 4, 1928 |
| 2,198,794 | Smith | Apr. 30, 1940 |
| 2,296,427 | Daniel et al. | Sept. 22, 1942 |
| 2,400,129 | Nelson | May 14, 1946 |